US005673144A

United States Patent [19]
Chastang et al.

[11] Patent Number: 5,673,144
[45] Date of Patent: Sep. 30, 1997

[54] OBLIQUE VIEWING MICROSCOPE SYSTEM

[75] Inventors: Jean-Claude Andre Chastang, Mahopac; Kathryn Barr Kirtley, Katonah; Alan Edward Rosenbluth, Yorktown Heights, all of N.Y.

[73] Assignee: International Business Machines, Corporation, Armonk, N.Y.

[21] Appl. No.: 306,238

[22] Filed: Sep. 14, 1994

[51] Int. Cl.$^6$ .............................. G02B 21/00; G01B 9/02
[52] U.S. Cl. ........................ 359/385; 359/368; 356/354; 356/401
[58] Field of Search ............................ 359/368, 369, 359/384–389, 558, 564–569, 196–197, 201, 209, 212–215; 356/319, 328, 356, 401, 354

[56] References Cited

U.S. PATENT DOCUMENTS

| | | | |
|---|---|---|---|
| 3,862,357 | 1/1975 | Kanazawa et al. | 359/563 |
| 4,246,548 | 1/1981 | Rutz | 372/101 |
| 4,368,489 | 1/1983 | Stemme et al. | 359/214 |
| 4,428,676 | 1/1984 | Chastang et al. | 356/354 |
| 4,541,697 | 9/1985 | Remijan | 351/211 |
| 4,703,408 | 10/1987 | Yonezawa et al. | 369/44.13 |
| 4,708,484 | 11/1987 | Komeyama et al. | 356/401 |
| 4,908,506 | 3/1990 | Coops et al. | 250/201.5 |
| 4,969,739 | 11/1990 | McGee | 356/328 |
| 5,132,824 | 7/1992 | Patel et al. | 359/94 |
| 5,159,487 | 10/1992 | Geiger et al. | 359/330 |
| 5,327,218 | 7/1994 | Igaki | 356/356 |
| 5,424,833 | 6/1995 | Huber et al. | 356/356 |
| 5,461,687 | 10/1995 | Brock | 385/31 |

FOREIGN PATENT DOCUMENTS

| | | |
|---|---|---|
| 684647 | 8/1979 | U.S.S.R. |
| 1527611 | 7/1989 | U.S.S.R. |

OTHER PUBLICATIONS

English Abstract of the SU–1,527,611.
English Abstract of the Su–684,647.
"Oblique Viewing Attachment for Microscope", Proceedings of the SPIE, vol. 399 Optical System Design and Production, Apr. 1983.

*Primary Examiner*—Thong Nguyen
*Attorney, Agent, or Firm*—Scully, Scott, Murphy & Presser

[57] ABSTRACT

An improved oblique viewing microscope system including a diffraction grating that oscillates in the plane of the grating and/or an illuminator that oscillates the light rays directed to the object synchronized with the grating period. Additionally, a low frequency diffraction grating is also disclosed. The oscillation and/or low frequency grating provide a high resolution, multi-color image of an object viewed at an oblique angle. A dual oblique viewing microscope system is also disclosed to provide Koehler illumination.

21 Claims, 4 Drawing Sheets

OBLIQUE VIEWING MICROSCOPE SYSTEM

This application claims the benefit of the filing date U.S. application, Ser. No. 08/283,053 filed on Jul. 29, 1994 entitled IMPROVED OBLIQUE VIEWING MICROSCOPE SYSTEM to Chastang et al now abandoned.

BACKGROUND OF THE INVENTION

1. Field of the Invention

The present invention is directed to oblique viewing optical systems and more particularly to an improved oblique viewing microscope for providing a high-resolution multi-color image of an object.

2. Description of the Prior Art

Manufacturing inspection systems are of great importance as quality control improvement can provide a significant advantage in today's highly competitive marketplace. For example, in the manufacture of semiconductor chips, the inspection of solder pads for connecting the chips to a wafer or other substrate is a critical element for achieving high production efficiency in what is now known as "flip chip" technology.

U.S. Pat. No. 4,428,676, assigned to the same assignee as the present invention and having a common inventor, discloses an oblique viewing microscope (OVM) that significantly improved the speed and information obtained by optical inspection of the solder pads. The prior art OVM uses a 1:1 relay lens to project a monochromatic image of a substrate at an oblique angle with the normal to the substrate, onto a diffraction grating, at an oblique angle to the normal of the grating. Both oblique angles are equal to a common value $\alpha$.

Because it is obtained obliquely, the image of a solder pad array as captured by the OVM includes information relating to the height and volume of the pads from the size of the shadows of the solder pads that are observed. More generally, the OVM can be used to study the topography of three dimensional objects without scanning and/or refocusing. By contrast the previously known inspection equipment, using conventional optics, scans much smaller instantaneous fields, and is therefore much slower than the OVM system.

The diffracting grooves of the diffraction grating and the imaging obliquity are matched to the particular wavelength in such a way that the image is deflected into a microscope as if from an untilted object plane, i.e., in a direction substantially perpendicular to the plane of the grating, thus allowing magnification. For the previous condition to be fulfilled, there must exist between the wavelength $\lambda$ of the illumination, the period a of the grating the relationship:

$$\sin \alpha = n\lambda/a, \text{ where } n \text{ is an integer.}$$

The resolution of the microscope must be held below the period of the grating, in order that the grating grooves not modulate or "break-up" the image. Moreover, even when the objective is not capable of resolving the grating directly, it is also necessary to prevent the image from being distorted by coarser "Moire" type spatial frequencies that arise from interaction between object spatial frequencies and the spatial frequency harmonics of the grating. In other words, the spatial frequency content of the object causes each order diffracted from the grating to spread into a cone (of perimeter defined by the relay lens pupil), rather than propagating as a plane wave. In the prior art OVM, only one of these cones is collected by the microscope objective to form the image. The wavelength, grating and objective numerical aperture (NA) must be chosen so that all other cones are excluded in their entirety. While the prior art OVM system works well for some products, low contrast conditions often occur that cause the solder pads to become difficult to distinguish from the background. Poor contrast conditions appear to be due principally to diffraction from increasingly fine substrate circuitry, and to the presence of dielectric thin film overcoats (such as $SiO_2$). The thickness of this film varies significantly, causing strong variations in the monochromatic reflectivity of the chip.

Modern chips employ circuit and process film dimensions that can no longer be considered large on the scale of an optical wavelength. Since chips are optimized for reliability in their electrical properties rather than their coherent optical properties, chips invariably have considerable variation in their optical scattering characteristics. The contrast loss mechanisms result from a mismatch between the OVM wavelength and the chip structure and features. To ensure that a full diversity of chips be handled without problem, it is desirable for the imaging system to be as robust and flexible as possible. Such flexibility should include control over the NA and the spectrum.

SUMMARY OF THE INVENTION

The present invention is directed to improvements in the OVM system that solve the poor contrast problems of the prior art OVM, and the restriction to monochromatic illumination within limited NA.

In one embodiment, the NA of the detection objective and the wavelength spectrum are increased by oscillating the diffraction grating in the plane of the grating and/or oscillating the illumination source. The motion must be rapid enough to traverse an individual grating period in a time that is short compared to the integration time or response time of the detection objective. The oscillation in a preferred embodiment is by dithering, for example by oscillation in a saw-tooth or triangular waveform, such that the time-averaged diffracted orders are rendered incoherent with respect to one another, leaving the image unmodulated by grating fringes even when multiple orders enter the objective.

In another embodiment a low frequency diffraction grating, one in which the grating period is in the range of about 30 to 600 lines per mm, is used to replace the prior art high frequency grating (1200 to 1800 lines per mm). The use of a sufficiently low frequency grating solves the problem of the prior OVM system being limited to operation at a particular wavelength. In accordance with the present invention an OVM having a low frequency grating allows multiple orders at one or more wavelength to enter the detection objective lens in a symmetric way to provide a high contrast image. In the prior art OVM, the resolution of the detection objective cannot be fine enough to resolve the grating period. The low frequency oscillated grating OVM of the present invention removes the constraint on the size of the NA of the detection objective, i.e. the constraint on its resolution, as well as allowing a broader spectrum of wavelength to be used for illumination, resulting in a multi-color image to further enhance the viewing capabilities.

The OVM of the present invention has many applications beyond chip inspection. White light and variable resolution tend in general to provide better understanding of a scene or specimen. Any industrial process in which a substrate is bombarded, coated, or fetched from directly overhead is a natural candidate for oblique viewing. A conventional chamber window allows only low NA observation (e.g. with the unaided eye or with a low power microscope), which is often insufficient to resolve in-situ contaminant generation, etc. The present invention allows the process to be monitored in color with adjustable resolution and magnification.

In a preferred embodiment, the OVM includes both a low frequency diffraction grating and means for oscillating the grating and in an alternative embodiment oscillating the grating in conjunction with the illumination source. The oscillation feature together with a low frequency grating provides a polychromatic OVM in which the microscope objective is allowed to collect from the grating multiple diffraction orders in a plurality of wavelengths that are rendered incoherent with respect to each other resulting in a very high resolution, high contrast, multi-color image for viewing the illuminated object for manufacturing inspection or other purposes.

DETAILED DESCRIPTION OF THE INVENTION

Figure 1:
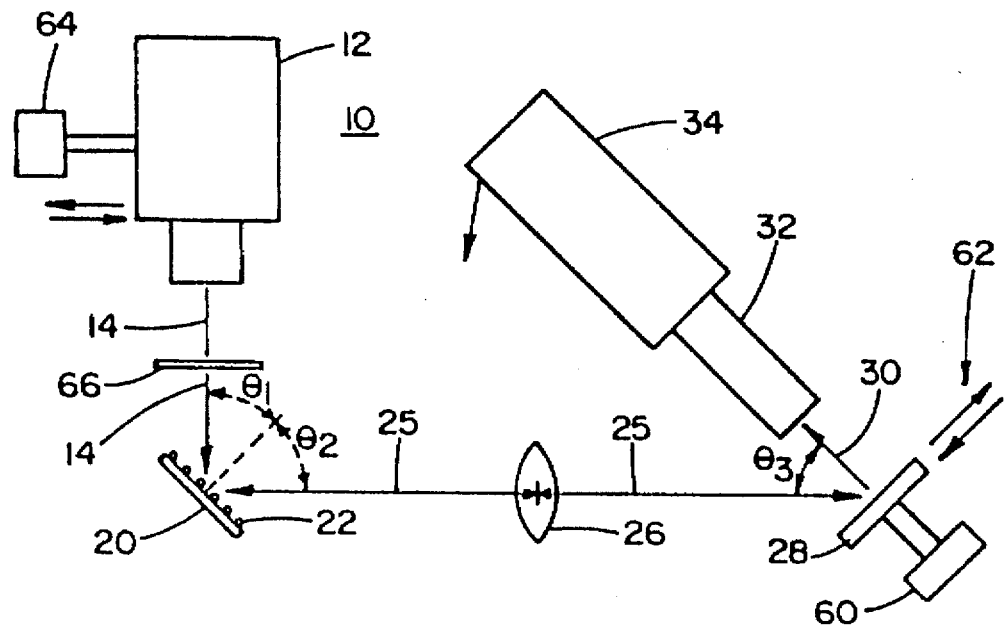
FIG. 1 is a schematic view of one embodiment of the OVM system in accordance with the present invention.

In accordance with a specific embodiment of this invention as shown in FIG. 1, the optical system 10 includes illuminator 12 which provides a source of light. A non-limiting example of an illuminator 12 is a projector lamp. A beam of light 14 from the illuminator strikes the chip 20 having the solder mounds 22 thereon.

Figure 2:
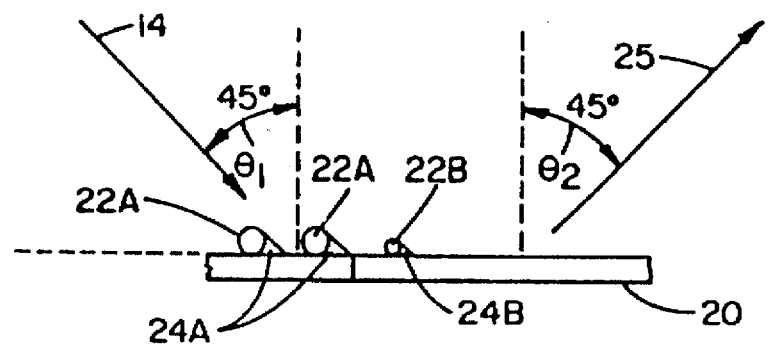
FIG. 2 is an enlarged side view of a beam of light having an oblique incidence to the solder mounds on the chip of FIG. 1.

An enlarged view of the light 14 striking the chip 20 is shown in FIG. 2. The beam of light 14 strikes a chip and solder mounds 22A and 22B at an angle $\Theta_1$ which in this case is 45°. While $\Theta_1$ in this example is 45°, this angle may vary from about 30° to 60° or more depending on the particular application. Solder mounds or pads 22A are larger than solder mound 22B and, accordingly, the shadows 24A are larger than the shadow 24B. Since the chip 20 is quite specular, substantially all of the incident light 14 is reflected as light beam 25 and very little light is scattered in the direction perpendicular to the plane of the pad array. The reflected light 25 makes an angle of $\theta_2$ with the perpendicular to the chip 20. $\Theta_2$ is equal to $\theta_1$ and in this case $\Theta_2$ is 45°.

As shown in FIG. 1, a lens 26 is positioned in the path of the reflected beam 25 so that the axis of the lens is parallel to the reflected beam 25. The lens 26 images the solder mound array onto a diffraction grating 28 with a magnification of substantially −1×. It is essential that the magnification be unity in absolute value for it is only in this case that when the object is tilted with respect to the optical axis, that the image is equally tilted but in the opposite direction, and so does not present the usual defects that magnified tilted images present such as anamorphosis and the keystone distortion. In a preferred embodiment, the lens 26 should also be telecentric and afocal. However, this restriction can be lifted in certain less demanding applications (typically non-metrological applications) or when the field to be obliquely observed is very small. While the lens 26 is an example of a dioptric system, it is possible to substitute a catoptric system or a catadioptric system for the lens 26. In all cases the magnification of the system must be substantially one (absolute value).

In a preferred embodiment of the present invention, the OVM system includes means for oscillating the diffraction grating in its own plane. FIG. 1 includes means 60, which can be a motor driven system, a piezo drive, a vibrating spring system or other suitable system for moving the grating back and forth in the-general direction shown by the arrows 62. In an alternative embodiment, the illumination pattern 14 is oscillated by an oscillating means 64 coupled to illuminator 12. In a further alternative embodiment, both the illuminator 12 and grating 28 are oscillated, preferably in synchronization. The oscillation must be rapid enough to traverse an individual grating period in a short time compared to the integration time or response time of the objective instrument 32, or observer. Illustratively, the distance of each oscillation cycle is less than the depth of focus of the objective lens 32. In a preferred embodiment, dithering the grating in-plane with a triangular waveform results in the time-averaged diffracted orders being rendered incoherent with respect to one another, leaving the image unmodulated by grating fringes even when multiple orders enter the objective. The total image produced by such multiple incoherent orders is analogous to that produced using off-axis illumination in photolithography. To avoid stroboscopic effects with non-static specimens, a grating oscillation frequency must be chosen that avoids all frequencies of the object motion.

When broadband illumination is used, it is desirable that the objective NA be large enough to substantially enclose at least two of the cones of light diffracted by the grating in each wavelength. In this way the incoherent superposition that comprises the total image will include dominant components whose object spatial frequencies are not significantly vignetted by the objective. This is not a strong requirement; a similar truncation arises in conventional microscopy when the illumination aperture is opened wide. Moreover, the empty resolution obtained with an objective NA that too greatly exceeds the relay NA can actually be deleterious with an OVM. Even when the orders are rendered incoherent using the present invention, the image can be altered by a ripple effect. This arises as the object undergoes minute ripples in and out of the focal plane while undergoing reflection from the moving corrugated surface of the grating. Images formed from single diffracted orders show no such ripple. In the opposite geometrical limit in which many coherent orders enter the objective, the image undergoes a ripple that fully matches the ripple at the grating plane, limiting the allowable coarseness of the grating. One can consider the image formed from multiple orders that are incoherent to be blurred because of the different oblique perspectives with which features are seen in the incoherent component images. Excessive object NA that unnecessarily extends this range of perspectives is preferably avoided.

In a preferred embodiment, the oblique geometry is exploited to obtain a suitable compromise, in a very convenient way. At angles of obliquity in the vicinity of 60°, object features are foreshortened by about 2× when viewed by the relay lens, and this reduction in apparent size implies an effective approximate 2× reduction in the relay lens NA relative to the objective NA. If the NAs of the relay lens 26 and objective lens 26 are nominally equal in the conventional sense, one finds that this 2× effective difference yields a system in the above mentioned desirable configuration where the objective forms its image from 2 or 3 diffracted orders in every wavelength. In many cases there would also be little point in employing a higher NA objective with a blazed grating, because the narrow scatter function of each blaze would leave little energy in the additional orders that the increased NA would intercept.

The capabilities of such a system are then limited only by the optical design of the relay lens and objective. There is also a practical limit of 0.5 NA at 60° with reflection gratings, in the absence of a beamsplitting arrangement. There is no such limit when the sample is viewed in transmission. Further, the present invention removes a practical impediment to transmission mode operation of the OVM, in that the inevitable cosmetic blemishes seen in transmission gratings can be blurred to invisibility by the grating motion. Cosmetic blemishes are present even with reflection gratings and this problem is greatly reduced by the present invention.

The motion can also be advantageous in high fluence applications to prevent grating damage. In one particular application, it was found that a faint burned-in image of the solder pads eventually imprinted on the prior art static grating. This image (a superposition of a large number of individual chip images) could theoretically become strong enough to mask defects in the true chip image. The proposed grating motion would dilute the peak fluence, and would cause all grating grooves to receive the same time-averaged exposure.

Figure 3:
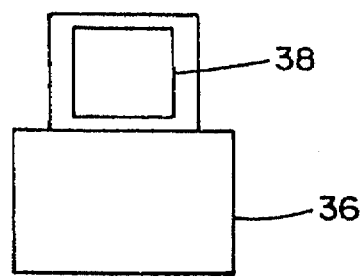
FIG. 3 is a schematic view of the viewing portion associated with the optical system of FIG. 1.

Referring again to FIG. 1, the image of the solder mound array that is reflected by the grating 28 as beam 30 is magnified by a microscope objective 32 and projected onto the photosensitive surface (not shown) of the TV camera 34. The optical axis of the TV camera lens 34 is normal to the grating 28. The reflected beam 30 is substantially normal to the grating 28 and forms an oblique angle $\theta_3$ with the beam 25 which is reflected from the chip 20 and focused by lens 26. This oblique angle $\theta_3$ is equal to the oblique angle $\theta_2$, which is equal to the oblique angle $\theta_1$, i.e., $\theta_3=\theta_2=\theta_1$. The TV camera 34 shown in FIG. 1 is connected to a digital image analyzer 36 as shown in FIG. 3. The image analyzer 36 is connected to a display screen 38 on which the chip image is shown. In the embodiment described above, the use of a T.V. camera is exemplary. In fact, other detectors could be used such as the human eye, a photographic emulsion, etc.

Figure 4:
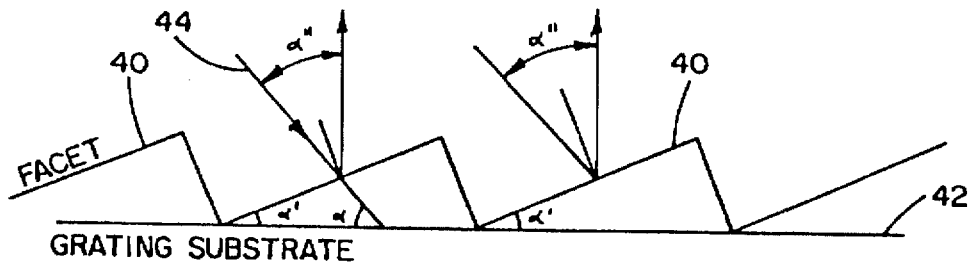
FIGS. 4 and 5 are schematic illustrations of a low frequency diffraction grating in accordance with the present invention.

In accordance with another embodiment of the present invention, the diffraction grating is a low frequency grating having a grating period in the range of about 30 lines per mm to about 600 lines per mm. A diffraction grating is a reflection or transmission optical device that includes a series of grating lines or grooves to diffract the light scattered by the grating. The depth spacing or period and shape of the grooves defines the nature of the light diffraction. The grating period is often indirectly defined by the number of lines or grooves per a spatial measurement, typically in mm. A common diffraction grating is formed with a series of blazes or facets on the surface of the optical element, such as that illustrated in cross-sectional view in FIG. 4. The gratings consist of the juxtaposition of a number of identical facets 40 all parallel to each other. These facets 40 may, in the geometrical limit, be treated as small mirrors which are oriented at an angle $\alpha'$ with the surface 42 of the grating. The incident light rays 44 make an angle $\alpha'$ with the grating surface 42 and an angle $\alpha''$ with the normal of the surface 42. The light rays are reflected parallel to the normal of the grating surface 42. The use of a sufficiently low frequency grating allows multiple orders to enter the objective at each wavelength, so that light from the ensemble of wavelengths of a polychromatic light source will fill the objective in a substantially symmetric way. In addition, if a monochromatic light source is used, multiple orders at the particular wavelength will enter the objective lens 32 substantially symmetrically. The NA of the objective lens 32 is chosen accordingly to capture a particular wavelength when monochromatic light is used or two or more wavelengths when polychromatic light, such as white light, is used. In both cases, improved contrast and resolution in the resultant image is achieved. The resolution however is lower than if dithering is added. To achieve the maximum resolution potential, dithering can be included. By allowing multiple wavelengths, a multi-color image is provided which further improves the contrast and resolution of the OVM.

In one embodiment of the invention, a grating period is chosen such that three orders diffract into the objective lens 32 at each wavelength in the illumination. It is difficult to prescribe specific numerical values for the grating period except in reference to a particular OVM application, but it is considered preferable to use gratings in the range of 30 to 600 lines/mm (i.e. period between 1/30th and 1/600th mm). At higher frequencies the image quality decreases because the range of directions viewed by the objective is sampled in an incomplete and asymmetric way as the diffraction orders become more sparse. However, in many cases the imagery would be quite acceptable, so long as any grating features in the image are suppressed.

Figure 5:
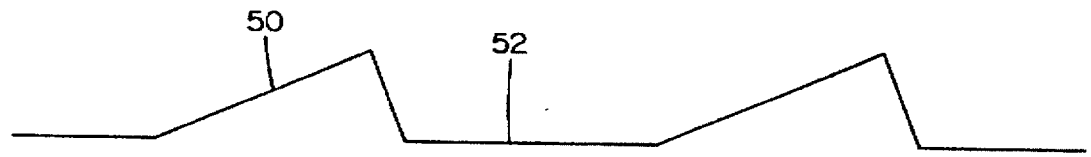
Figure 7:
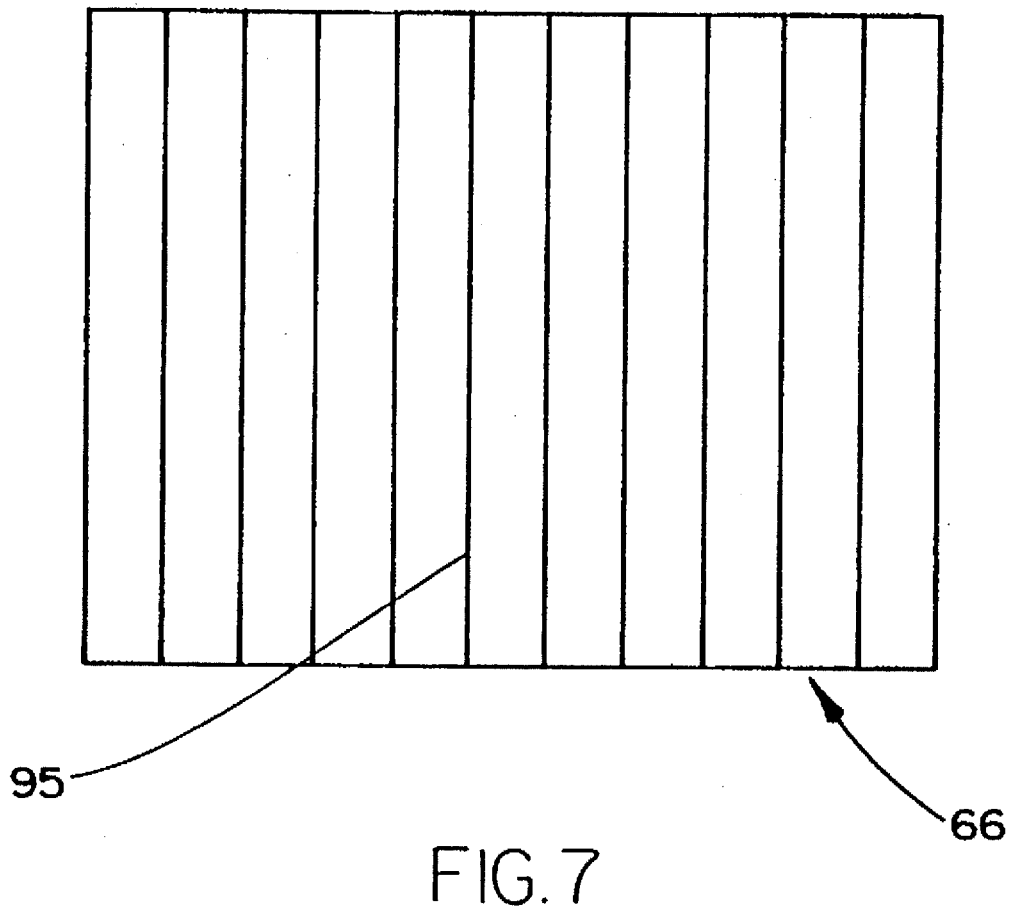
FIG. 7 shows a slotted filter in accordance with the present invention.

In another embodiment of the invention, the grating facets are separated by blank spaces or deadzones, rather than being juxtaposed. An illustration of such a grating surface is shown in FIG. 5, wherein the facets 50 are separated by spaces 52. The spaces 52 are non-reflective and when the object is illuminated with stripes of light, such as by using a filter 66 comprised of a series of slits (see FIG. 1), whose images are aligned with the reflective blazes 50 and approximately matched in size to them, then strongly defocused light is largely rejected after being spread out over the deadzones 52, while the focused image remains largely unattenuated. This is in effect a form of scanning microscopy. FIG. 7 shows a slotted filter 66 having a series of slits 95. Illustratively, the spacing and size of the slits 95 of the filter 66 are substantially equal to the spacing a size of the grating facets that form the grating period.

The present invention also makes it possible to switch between objective lenses 32 of different NA without changing the grating 28, just as objectives are changed in a conventional normal incidence microscope. Since high NA objectives have a reduced field of view, the relay lens 26 need only be corrected at full aperture over a small field. Moreover, in applications that permit such observation (high-NA and narrow field), it may not be necessary to require that the relay lens be telecentric and afocal as stated earlier. The dithered grating of the present invention also provides an opportunity for positional filtering, which can improve contrast when one views a particular focused plane in an object having large depth extent. The reflecting facets on a conventional blazed grating reflect light from all portions of the relayed image into the objective lens, including light scattered from object features so strongly defocused as to form a mere blur or haze overlaying the focused features of interest. However, in a preferred embodiment of the present invention, the oscillated grating is also a low frequency grating having a large period, a significant fraction of which can be dedicated to a non-reflective deadzone 52 that would then separate adjacent blazes or facets, as shown in FIG. 5.

In addition, as shown in FIGS. 1 and 7, a slotted filter 66 comprised of a series of slits 95 or the like may also be used in this embodiment. As indicated above, the object is thereby illuminated with stripes of light, whose images are aligned with the reflective blazes and approximately matched in size to them so that strongly defocused light is largely rejected after being spread out over the deadzones 52, while the focused image remains largely unattenuated. A grating of this kind also reduces the ripple effect. The illumination must then be dithered in synchronism with the grating in order to produce a complete image over the time-average.

The present invention provides a polychromatic OVM system in which the microscope objective is allowed to collect multiple diffraction orders from the grating, because the orders are rendered incoherent with respect to one another by dithering the grating in time. In a preferred embodiment, the grating is oscillated with a triangular waveform such that the excursion is an integer multiple of the grating period, such as about 22 to 100 times the grating period.

Figure 8:
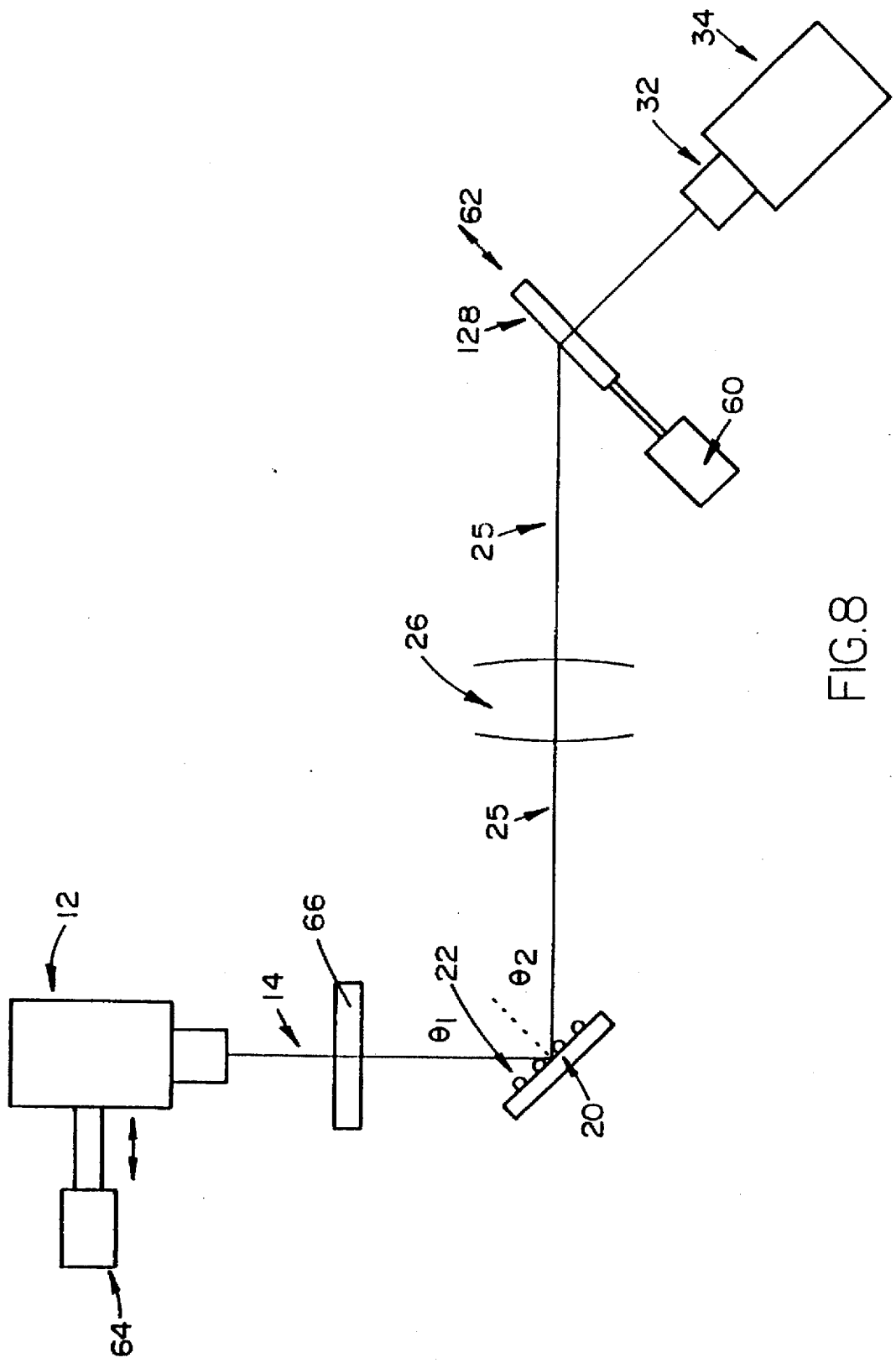
FIG. 8 shows an optical system in accordance with another embodiment of the present invention.

The OVM system of the present invention allows the use of multiple objectives of different NA, with the NA of the fine objectives chosen to allow two or more orders at each wavelength in the spectrum. In a sample configuration appropriate for the inspection of solder pads, the 436 nm mercury line might represent the approximate center of the illumination bandwidth, the obliquity might be around 50°, and the relay and maximum objective NAs might be around 0.25 (in the conventional rotation-symmetric sense). Such an obliquity produces an 2× effective foreshortening along one axis of the relay NA relative to the objective NA. Such a ratio of pupil NA to relay NA is quite suitable for minimizing chromatic channeling without accentuating the ripple effect. In another sample system, the grating excursion is large compared to the illuminated area in order to reduce the time-averaged thermal load on the grating in high fluence applications. For example, the oscillation can be twice as large as the widest high fluence region. Where a transmission grating is used, the dithered excursion should be large enough to blur any cosmetic defects in the grating. For example, the oscillation can be twice as large as the defects. FIG. 8 shows an optical system 100 in accordance with another embodiment of the present invention. The optical system 100 is similar to the system 10 of FIG. 1, except the reflective grating 28 of the system 10 replaced with a transmissive grating 128. In addition, the objective 32 and camera 34 are located behind the transmissive grating 128.

The present invention also allows positional filtering in which illumination having the form of an oblique series of slit images is dithered in synchronism with a custom grating containing a series of separated reflecting facets that serve to filter from the image any rays that are deviated from the illuminated slit patches, such as by diffractive spreading or by scattering from defocused features of the object. An example of the positional filtering embodiment includes illumination that takes the form of an array of parallel slitlike images, spaced for example at 100 to 300 slits per mm, that are dithered in synchronism with the grating, and whose image through the relay lens is aligned with the reflecting facets of the grating, with the grating period including a significant deadzone between the reflecting facets, such as at least half of each grating period.

As indicated, a preferred embodiment includes a movable grating having a relatively low spatial frequency. The spatial frequencies envisaged here are comprised between 30 lines/mm and 600 lines/mm. The corresponding spatial periods are comprised between 1.6µ and 33µ. The gratings are oscillated in order to sweep the grating periods, or equivalently, to ramp the scattering amplitude with a time-varying phase factor.

As opposed to the conventional OVM arrangement where monochromaticity is imperative, the system of the present invention can operate at several wavelengths simultaneously, or even with a continuous spectrum. It is no longer necessary to hold the NA below the level at which grating modulation is observed.

For a more complete understanding of the invention, it is useful to consider the operation of the OVM of the invention in qualitative terms. The arrangement resembles existing OVMs, except that multiple copies of the image enter the lens in each wavelength. These images are biased into different carrier directions (grating orders), producing interference fringes where they recombine. The total image essentially consists of the object modulated by the resolved grooves of the grating.

The grating modulation can be blurred to an arbitrarily low level in a time integrated image, if the grating is moved. One approach is to simply provide the grating with a motion whose total excursion is large compared with the grating period. Exact cancellation can also be obtained by dithering the grating with a triangular motion whose period is an integer multiple of the grating period.

For clarity, the analysis of the grating motion will be in the simple case of a one dimensional object and a grating having a period such that only two orders are diffracted into the objective at some wavelength of interest. The analysis includes the assumption of a scaler "thin-grating", i.e., in describing diffraction from the grating of an incident plane-wave component, it is assumed that the light in the near-field just beyond the grating can be written as a sum of plane waves, each given by the product of the incident wave and a single Fourier component of the grating profile. For illumination incident on the object at an angle $\alpha_{Illum}$, the amplitude in the final image is:

$$A(\alpha_{Illum}, x_{Image}) = T_n(\alpha_{Illum}, x_{Image}) + T_{n+1}(\alpha_{Illum}, x_{Image}), \quad (1)$$

where n and n+1 are the two orders captured by the objective, and where:

$$T_n(\alpha_{Illum}; x_{Image}) = \iint dx_{Object} dx_{Grating} A_0(\alpha_{Illum}) O(x_{Object})$$

$$h_{Relay}(x_{Grating} - x_{Object}) e^{jk \sin \alpha_{Illum} x_{Object}}$$

$$h_{Objective}(x_{Image} - x_{Grating}) G_n(k\, \alpha_{Illum}) e^{-j2\pi n \frac{\lambda}{p} x_{Grating}} \quad (2)$$

with $A_o(\alpha_{Illum})$ the illumination amplitude incident from $\alpha_{Illum}$, $G_n$ the nth order amplitude reflectance of the grating, and $O(X_{object})$ the specimen reflectance. In these equations, $h_{Relay}$ and $h_{objective}$ are the amplitude response functions of the relay and objective lenses. The total intensity distribution in the final image is given by the integral of the square of eq. 1 over all $\alpha_{Illum}$ and $\lambda$. If the grating excursion varies in time as a function $X_G(t)$, the grating reflectance under the above assumptions will vary as $$G_n(\alpha_{Illum}) = |G_n(\alpha_{Illum})| e^{i(\phi_n(\alpha_{Illum}) + 2\pi n \lambda / PX_G(t))}. \quad (3)$$

If "< >" denotes time integration, then the cross term $5T_n T^*_{n+1}$ in the square of eq. 1 will contain a term $$<\cos[(\phi_n - \phi_{n+1}) + \pi \lambda / PX_G(t)]>. \quad (4)$$

This time average vanishes when $X_G$ varies linearly with time at a rate such that the grating traverses an integer number of periods during the integration time. The time average is bounded throughout the excursion, and becomes arbitrarily small relative to the time-independent terms as the excursion is increased.

According to the above analysis, the final image produced by the multiple incoherent images is equivalent to that produced by multiple discrete directions of illumination on an effective object, where this effective object is essentially the convolution of the true object with the amplitude impulse response of the relay lens. This is mathematically similar to off-axis illumination in conventional imaging, a technique sometimes used to advantage in photolithography.

However, in the present invention, there are two additional stages of averaging that significantly inhibit these effects. First, the discrete sampling involved in the directional splitting changes continuously over the spectrum, so that some distribution judged favorable could only be obtained at isolated wavelengths in the spectrum. Second, in most cases the illumination applied to the object will already be continuous in directionality (as well as spectrally), so the additional directional multiplication that arises at the grating is blurred out.

A large excursion embodiment is advantageous in high fluence applications to prevent grating damage. Even with modest excursions, the dithered grating in the present invention will blur artifact images dramatically, during both their imprinting on the grating and their subsequent projection onto the product images being analyzed. Moreover, with a large excursion, the illumination can be spread over a large area, reducing the fluence load on the grating in high power applications. The oscillation direction could be chosen to maximize the time-averaged uniformity of the dose on all grooves (so long, of course, as the oscillation is not parallel to the grooves).

As in any optical instrument pupil considerations are very important in the OVM. It is essential to keep in mind that the OVM is in effect an instrument which results from the combination of two distinct optical systems that are united through the agency of a diffraction grating.

Each system must be independently corrected and optimized. Also the diffraction grating is not simply a "passive" screen. It is a genuine optical component which possesses imaging properties of its own.

These imaging properties must imperatively be taken into account when the characteristics of the total system are derived or when they are optimized. One such property is anamorphosis. The OVM unlike most conventional optical instrument does not have an axis of symmetry. This situation arises because, although the relay lens 26 and the microscope objective 32 are rotation symmetric, the system as a whole is not rotation symmetric. It only has a plane of symmetry. The relay lens and the microscope objective naturally have isotropic resolution in the conventional sense. However, because the specimen is tilted, features perpendicular to the tilt axis are foreshortened and therefore more difficult to resolve. Accordingly unless certain measures are taken the resolution of the OVM is a function of the azimuth of the location of the object with respect to this plane of symmetry. In other words, the resolution of the OVM is anisotropic with respect to coordinate axes that are embedded in the tilted plane of the specimen. This feature is inherent to oblique imaging and is simply a geometrical consequence thereof. This anisotropy may or may not be considered an impediment. Anisotropy (provided that it is not too pronounced) is certainly visually extremely hard to detect and can be tolerated in most instances. However certain situations may call for its elimination. This is done by altering the pupil so that the foreshortened resolution along one axis is matched by the resolution along the other axis, as described by Chastang, "Oblique Viewing Attachment for Microscope", Proceedings of the SPIE, Vol. 399 "Optical System Design and Production", 1983.

In a preferred embodiment the relay lens pupil 26, and the microscope objective pupil 32 are in conjugate planes when they are superimposed. This does not mean that they are images of each other. Again it is important to acknowledge the imaging function of the grating in this conjugation.

The foreshortening discussed above has the effect in the space of the microscope pupil of causing a contraction of the circular relay lens pupil into an ellipse with smaller NA perpendicular to the tilt axis. This has the advantage of permitting the microscope objective to capture the 2 or 3 dominant orders diffracted by the grating. This pertains to the preferred embodiment in which the nominal NA of the relay lens and objective are substantially equal.

Moreover in the preferred embodiment described above in which the nominal NA of the microscope objective and that of the relay lens are substantially equal, empty magnification in the microscope objective is minimized, thus avoiding unnecessary resolution of the ripple effect in the grooves.

Also the anamorphosis caused by the grating will cause the image of the relay lens pupil when projected onto the microscope objective pupil to lose its "familiar" circular contour. In general the new contour is elliptical if the original contour was circular (i.e. before imaging by the grating). If anisotropic resolution is deemed undesirable isotropic resolution may be restored by making the original contour suitably elliptical so that after anamorphotic imaging it becomes circular.

In the case where the frequency of the grating is relatively low the diffraction grating creates a multiplicity of relay lens pupils. This multiplicity is equal to the number of diffracted orders which are permitted to enter the microscope objective, to each diffracted order corresponds an image of the relay lens pupil. This implies that the pupil of the microscope objective must be sufficiently large to accommodate most of these images of the relay lens pupil. It is shown above that when the grating is translated the individual relay lens pupils can be considered optically incoherent from each other.

In yet another embodiment of the present invention, a dual OVM is implemented to provide Koehler illumination. The use of a dithered grating makes it possible to increase the focal selectivity through operation with patterned illumination. The gratings in both a first-stage (illuminating) OVM and a second-stage (imaging) OVM contain alternating bright and dark amplitude stripes or facets. (Reflecting facets can be "bright" or "dark" depending on whether they are blazed to maximally diffract light into the relay lens, or away from it.) The motion of this first-stage grating is synchronized with that of the second-stage grating, so that the bright stripes which sweep across the object will always track either the dark facets (pseudo-dark-field mode) or the bright facets (bright-field mode) when re-imaged onto the second stage grating.

The dual OVM described above will provide a Koehler Illumination Method (KIM). The KIM is highly desirable because the illumination thus produced is very uniform and its level and degree of partial coherence as well as the size of the illuminated area can be adjusted easily. It is therefore widely used particularly in microscopy but needs the present invention to be implemented in the OVM context.

Figure 6:
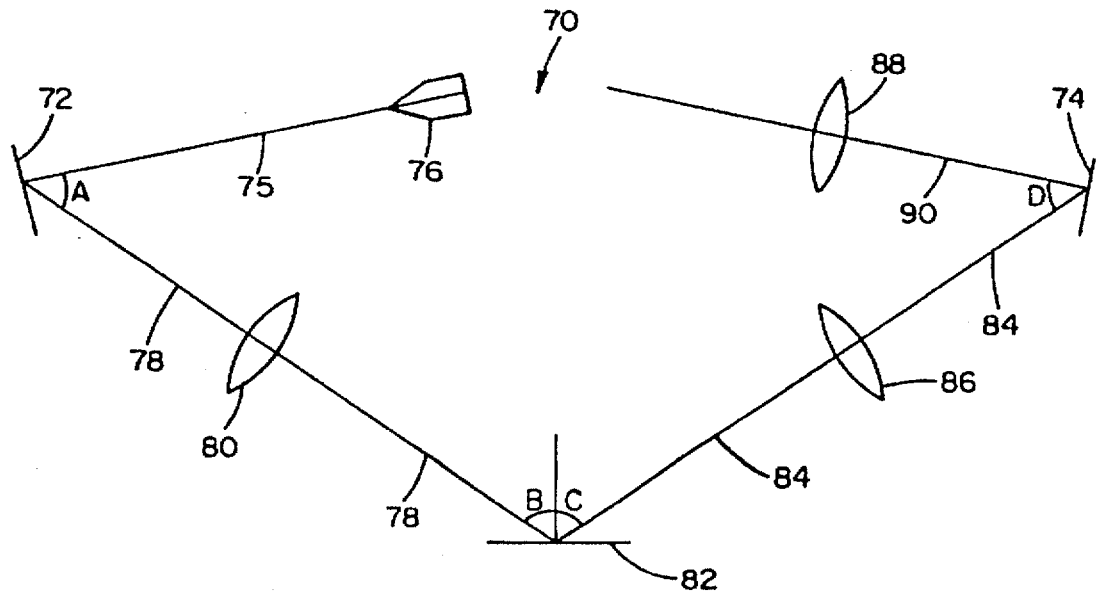
FIG. 6 is a schematic view of a dual OVM embodiment of the present invention.

An OVM equipped with a KIM illumination is shown on FIG. 6. The system 70 includes a first diffraction grating 72 and a second diffraction grating 74. One can see the symmetry that exists in this arrangement between the gratings 72 and 74. Light rays 75 from Koehler illuminator 76 impinges upon grating 72 perpendicular thereto. Light rays 78 diffract from grating 72 at an angle A to the normal. Relay lens 80 focuses light 78 onto the object 82 at angle B to the normal to the object. Light rays 84 are reflected at angle C to the normal and focused by relay lens 86 onto diffraction grating 74 at an angle D to the normal of the grating. Microscope objective 88 captures the diffracted light 90 from the grating and projects the light onto a viewing system (not shown). Means may be provided (not shown) for oscillating one or both of gratings 72 and 74 and/or illuminator 76. This new arrangement combines the principles of the OVM and of the KIM and offers the remarkable advantages of both. It can be observed that in effect this new instrument consists of two OVM arrangements placed face to face. Illuminator 76 has an exit pupil at infinity and images the source with field aperture directly onto grating 72. These two positions, and only these two positions, are stigmatic imaging planes for such a planar grating element, allowing relay lens 80 to reproduce a uniform, sharply defined field of illumination on specimen 82, with the source correctly imaged at infinity.

It is important to note that the unity magnification illumination relay lens 80 does not have to be identical to the unity magnification observation relay lens 86, apart from being telecentric and afocal in most instances. In particular their numerical apertures can be quite different. It could be smaller or larger.

As with classical systems that provide Koehler illumination for normal incidence observation, the KIM/OVM arrangement for oblique viewing produces a very uniform sample illumination, permits the easy and continuous variation of the sample illumination level, permits the easy and continuous variation of the degree of spatial coherence of the sample illumination, and permits the size of the illuminated area to be easily adjustable. Also a variety of "classical" microscopic techniques are readily extendable to the KIM/OVM arrangement, namely: a phase contrast arrangement, a dark field arrangement, and a differential interferometric contrast type arrangement. The special prisms that this application requires could be Wollaston prisms placed in the pupil planes of the relay lenses 80 and 86.

The oblique viewing microscope system of the present invention will permit foreign material to be distinguished from intentional patterning of the specimen. The oblique channel would also be useful in guiding contact of a probe to the substrate. One would not have to refocus the viewer after stepping the probe, and the simultaneous oblique view of the probe and its shadow would be helpful in judging the approach towards contact.

Microsurgery procedures often require unobstructed access from above. Only moderate magnification might be required during oblique viewing, but the surgeon would presumably prefer observation in white light. Here too, the oblique perspective could be of direct advantage, for example in the ophthalmological technique known as "corneal sculpting", in providing a sense of the gentle change in convexity as a cornea is ablated by laser light introduced from a normal incidence channel.

Even in low NA machine vision applications where subjective color sense is not likely to be of concern, the ability to decompose an image spectrally might still provide useful information about the scene.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described the invention, what is claimed as new and what is desired to be secured by Letters Patent is:

1. An oblique viewing microscope system for providing a high-resolution, multi-color image of an object, comprising:

means for reflecting an image of an object at a first oblique angle with the normal to the object;

relay means for projecting the reflected image with a magnification of magnitude substantially unity;

a movable diffraction grating having a grating period for diffracting the projected image into a plurality of orders, said grating being tilted so that said relay means projects the image onto said grating at a second oblique angle to the normal of the grating, said orders as a group being diffracted substantially parallel to the normal of said grating;

means for oscillating said diffraction grating in the plane of the grating;

means for illuminating the object through a filter means having a plurality of slits and means for oscillating the illumination means so that said reflected image is an array of parallel slit-like images; and detection means for capturing at least two orders and projecting said captured orders into a display means for combining said orders into a high-resolution, multi-color image of said object for viewing.

2. The system of claim 1 wherein said oscillation means oscillates said grating in a triangular waveform.

3. The system of claim 1 wherein a distance of each oscillation cycle is greater than the grating period.

4. The system of claim 3 where the distance of each oscillation cycle is in the range of 2 times to 100 times greater than the grating period.

5. The system of claim 3 where the distance of each oscillation cycle is synchronized to be an integer multiple of the grating period.

6. The system of claim 1 where said capturing means includes an objective lens means.

7. The system of claim 6 where a distance of each oscillation cycle is less than a depth of focus of the objective lens means.

8. The system of claim 6 wherein said objective lens means has a numerical aperture chosen to capture two or more wavelengths thereby providing a multicolor image for viewing.

9. The system of claim 6 where said objective lens means includes a plurality of lenses each having a different numerical aperture, the largest numerical aperture being chosen to capture at least two different orders at every wavelength thereby providing a multicolor image for viewing.

10. The system of claim 1 wherein a time period of each oscillation cycle is less than a response time of the detection means.

11. The system of claim 1 wherein said object includes one or more high fluence regions and wherein a distance of each oscillation cycle is larger than a width of the highest fluence regions.

12. The system of claim 11 where the oscillation distance is at least two times larger than the width of the highest high fluence region.

13. The system of claim 1 where the direction of oscillation is perpendicular to the grating lines that comprise the grating period.

14. The system of claim 1 wherein the object oscillation cycle distance is synchronized with the grating period.

15. The system of claim 1 where a spacing and size of the plurality of slits of the filter are substantially equal to a spacing and size of grating facets that form the grating period.

16. The system of claim 1 where said diffraction grating is a transmission grating.

17. The system of claim 1 wherein said diffraction grating is a reflection grating.

18. The system of claim 1 wherein said first and second oblique angles are equal in magnitude.

19. The system of claim 1 wherein said grating comprises a plurality of triangular facets equally spaced from each other by flat regions.

20. The system of claim 1 wherein said relay means is a telecentric and afocal lens.

21. An oblique viewing microscope system for providing a high-resolution, multi-color image of an object, comprising:

means for reflecting an image of an object at a first oblique angle with the normal to the object;

relay means for projecting the reflected image with a magnification of magnitude substantially unity;

a movable first diffraction grating having a grating period for diffracting the projected image into a plurality of orders, said grating being tilted so that said relay means projects the image onto said grating at a second oblique angle to the normal of the grating, said orders as a group being diffracted substantially parallel to the normal of said grating;

means for oscillating said movable first diffraction grating in the plane of the grating; and detection means for capturing at least two orders and projecting said captured orders into a display means for combining said orders into a high-resolution, multi-color image of said object for viewing, said reflecting means further comprising:

a second diffraction grating;

means for illuminating said second diffraction grating at an angle substantially normal to said second diffraction grating; and a second relay means for imaging the illuminated second diffraction grating onto the object at a third oblique angle with the normal to the object.

* * * * *